US010293695B2

(12) United States Patent
Boesing et al.

(10) Patent No.: US 10,293,695 B2
(45) Date of Patent: May 21, 2019

(54) CIRCUIT ARRANGEMENT FOR OPERATING AN ELECTRICAL MACHINE IN A MOTOR VEHICLE WITH PROVISION OF A DC VOLTAGE

(71) Applicant: Robert Bosch GmbH, Stuttgart (DE)

(72) Inventors: Matthias Boesing, Ludwigsburg (DE); Alexander Ross, Darmstadt (DE); Matthias Heil, Moeglingen (DE); Rostislav Rogov, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 15/550,162

(22) PCT Filed: Dec. 17, 2015

(86) PCT No.: PCT/EP2015/080140
§ 371 (c)(1),
(2) Date: Aug. 10, 2017

(87) PCT Pub. No.: WO2016/131515
PCT Pub. Date: Aug. 25, 2016

(65) Prior Publication Data
US 2018/0029484 A1 Feb. 1, 2018

(30) Foreign Application Priority Data
Feb. 19, 2015 (DE) .......... 10 2015 203 008

(51) Int. Cl.
*B60L 1/00* (2006.01)
*H02M 7/79* (2006.01)
(Continued)

(52) U.S. Cl.
CPC ............ *B60L 11/1814* (2013.01); *B60L 1/00* (2013.01); *B60L 15/04* (2013.01); *B60L 50/51* (2019.02);
(Continued)

(58) Field of Classification Search
CPC ....... H02M 7/79; B60K 6/485; B60L 11/1811
See application file for complete search history.

(56) References Cited

U.S. PATENT DOCUMENTS 5,583,406 A * 12/1996 Mutoh ...................... B60L 7/12
318/139
2004/0257018 A1* 12/2004 Tobias ................. B62D 5/0484
318/400.21

(Continued)

FOREIGN PATENT DOCUMENTS

| DE | 102011004248 | 8/2011 | |
| DE | 102012202867 | 8/2013 | |
| DE | 102012202867 A1 * | 8/2013 | .......... B60L 11/1811 |

OTHER PUBLICATIONS

International Search Report for Application No. PCT/EP2015/080140 dated Mar. 23, 2016 (English Translation, 2 pages).

*Primary Examiner* — Eduardo Colon Santana
*Assistant Examiner* — Cortez M Cook
(74) *Attorney, Agent, or Firm* — Michael Best & Friedrich LLP

(57) ABSTRACT

The present invention relates to a circuit arrangement (100) for operating an electrical machine (101) in a motor vehicle, having a first electrical drive train (103-1) in which a first battery direct converter (105-1) can be connected to the electrical machine (101) via a first switching device (107-1); a second electrical drive train (103-2) in which a second battery direct converter (105-2) can be connected to the electrical machine (101) via a second switching device (107-2); a third electrical drive train (103-3) in which a third battery direct converter (105-3) is connected to the electrical machine (101), one converter connection of which can be connected to the second drive train (103-2) via a third switching device (107-3) and the other converter connection of which can be connected to the second drive train (103-2)

(Continued)

via a fourth switching device (107-4); a DC voltage section (109) for providing a DC voltage for a vehicle electrical system, which DC voltage section is connected to the first, second and third drive trains (103-1, 103-2, 103-3) via a rectifier (111-1, 111-2, 111-3) in each case; and a charging section (113) for supplying a charging current to the first, second and third battery direct converters (105-1, 105-2, 105-3), which charging section is connected to the first drive train (103-1) and to the third drive train (103-3).

13 Claims, 6 Drawing Sheets

(51) Int. Cl.

| | | |
|---|---|---|
| *B60K 6/485* | (2007.10) | |
| *B60L 11/18* | (2006.01) | |
| *B60L 15/04* | (2006.01) | |
| *H02J 7/00* | (2006.01) | |
| *H02M 1/44* | (2007.01) | |
| *H02P 27/06* | (2006.01) | |
| *B60L 53/22* | (2019.01) | |
| *B60L 50/51* | (2019.01) | |
| *B60L 53/00* | (2019.01) | |
| *B60L 53/24* | (2019.01) | |
| *B60L 58/18* | (2019.01) | |
| *B60L 58/20* | (2019.01) | |

(52) U.S. Cl.
CPC ............... *B60L 53/00* (2019.02); *B60L 53/22* (2019.02); *B60L 53/24* (2019.02); *B60L 58/18* (2019.02); *B60L 58/20* (2019.02); *H02J 7/0052* (2013.01); *H02M 1/44* (2013.01); *H02P 27/06* (2013.01); *B60L 2210/42* (2013.01); *H02J 2007/0059* (2013.01); *Y02T 10/645* (2013.01); *Y02T 10/7005* (2013.01); *Y02T 10/7066* (2013.01); *Y02T 10/7072* (2013.01); *Y02T 90/127* (2013.01); *Y02T 90/14* (2013.01)

(56) References Cited

U.S. PATENT DOCUMENTS

| | | | |
|---|---|---|---|
| 2010/0051363 A1* | 3/2010 | Inoue | B60K 6/485 180/65.26 |
| 2010/0315024 A1* | 12/2010 | Najima | H02M 7/53871 318/139 |
| 2011/0198936 A1* | 8/2011 | Graovac | H02M 7/79 307/82 |
| 2012/0187886 A1* | 7/2012 | Mack | H02P 27/06 318/503 |

* cited by examiner though for example, the technical advantage is achieved that high-
CIRCUIT ARRANGEMENT FOR OPERATING AN ELECTRICAL MACHINE IN A MOTOR VEHICLE WITH PROVISION OF A DC VOLTAGE

BACKGROUND OF THE INVENTION

The present invention relates to a circuit arrangement for operating an electric machine, for example, an electric drive machine in an electric vehicle.

Electric vehicles may have multiple drive phase lines including battery direct inverters for an electric drive. In addition, in electric vehicles, it is necessary to implement a means for charging the battery stores from the grid and for providing a DC voltage.

The publication DE 10 2011 004 248 A1 relates to a circuit arrangement including a multistage converter for electric vehicles or hybrid vehicles.

SUMMARY OF THE INVENTION

The object of the present invention is to provide a circuit arrangement which enables a reception of electric power for charging battery cells, an output of electric power to the drive, and the feeding of additional vehicle electrical system components by means of a DC voltage.

According to a first aspect, the object is achieved via a circuit arrangement for operating an electric machine of a motor vehicle, including a first electric drive phase line in which a first battery direct inverter is connectable to the electric machine via a first switching device; a second electric drive phase line in which a second battery direct inverter is connectable to the electric machine via a second switching device; a third electric drive phase line in which a third battery direct inverter is connected to the electric machine, one inverter terminal of which being connectable to the second drive phase line via a third switching device, and the other inverter terminal of which being connectable to the second drive phase line via a fourth switching device; a DC voltage section for providing a DC voltage for a vehicle electrical system, which is connected to the first, second, and third drive phase line via a rectifier in each case; and a charging section for supplying a charging current to the first, second, and third battery direct inverter, which is connected to the first drive phase line and the third drive phase line. As a result, for example, the technical advantage is achieved that the circuit arrangement enables a reception of electrical energy from the grid, an output of electrical power to the drive, and feeding of additional vehicle electrical system components by means of a DC voltage during all operating states of the DC voltage feed-in.

The circuit arrangement achieves a highly flexible charging device having low technical complexity and a low number of components. The operating strategy of the battery direct inverter allows the provision of a DC voltage for a vehicle electrical system even at low motor speeds or when at a standstill, including charging operation. The interaction of the components of the charging section, the DC voltage section, and the drive section are required for a drive system which is suitable for a vehicle.

In one advantageous embodiment of the circuit arrangement, the charging section includes a bridge rectifier circuit for rectifying an input voltage. As a result, for example, the technical advantage is achieved that an AC voltage may be rectified and an operating strategy is simplified.

In an additional advantageous embodiment of the circuit arrangement, the charging section includes a grid filter or EMC filter for filtering an input voltage. As a result, for example, the technical advantage is achieved that high-frequency disturbances may be filtered.

In an additional advantageous embodiment of the circuit arrangement, the charging section includes a controller for controlling an input current. As a result, for example, the technical advantage is achieved that in the charge current controller, the half-wave sinusoid may be tracked for forcing a power factor near one. The amplitude is then determined within the permissible limiting values by the battery management system of the battery direct inverter.

In an additional advantageous embodiment of the circuit arrangement, the DC voltage section includes an intermediate circuit voltage controller for controlling an output voltage. As a result, for example, the technical advantage is achieved that the output voltage of the DC voltage section may be controlled to a predefined value.

In an additional advantageous embodiment of the circuit arrangement, a terminal of the charging section is connected between the first battery direct inverter and the first switching device. As a result, for example, the technical advantage is achieved that the charging current is directly fed into the first drive phase line, and all three drive phase lines are connected in series.

In an additional advantageous embodiment of the circuit arrangement, the DC voltage section includes a capacitor for smoothing the DC voltage. As a result, for example, the technical advantage is achieved that the total harmonic distortion of the DC voltage is reduced, and a limitation of the switching overvoltage may be carried out.

In an additional advantageous embodiment of the circuit arrangement, the circuit arrangement includes a control unit for controlling the switching devices based on a charging operation or a driving operation. As a result, for example, the technical advantage is achieved that the switching devices may be switched depending on the required state.

In an additional advantageous embodiment of the circuit arrangement, the circuit arrangement includes a control unit for distributing a voltage across the individual battery direct inverters. As a result, for example, the technical advantage is achieved that each of the battery direct inverters may be supplied with a different voltage, depending on the state.

In an additional advantageous embodiment of the circuit arrangement, the switching devices are formed by contactors. As a result, the technical advantage is achieved that a switching of high levels of electric power is made possible.

According to a second aspect, the object is achieved via a method for operating a circuit arrangement which is used for operating an electric machine of a motor vehicle, including a first electric drive phase line, in which a first battery direct inverter is connectable to the electric machine via a first switching device; a second electric drive phase line, in which a second battery direct inverter is connectable to the electric machine via a second switching device; a third electric drive phase line, in which a third battery direct inverter is connected to the electric machine, one inverter terminal of which being connectable to the second drive phase line via a third switching device, and the other inverter terminal of which being connectable to the second drive phase line via a fourth switching device; a DC voltage section for providing a DC voltage for a vehicle electrical system, which is connected to the first, second, and third drive phase line via a rectifier in each case; and a charging section for supplying a charging current to the first, second, and third battery direct inverter, which is connected to the first drive phase line and the third drive phase line, including the steps of setting a positive voltage offset between the two common connecting points of the drive phase lines; or setting a constantly positive voltage drop across the third battery direct inverter. As a result, the same technical advantages are achieved as via the circuit arrangement according to the first aspect.

BRIEF DESCRIPTION OF THE DRAWINGS

Exemplary embodiments are depicted in the drawings and are described in greater detail below.

DETAILED DESCRIPTION

Figure 1:
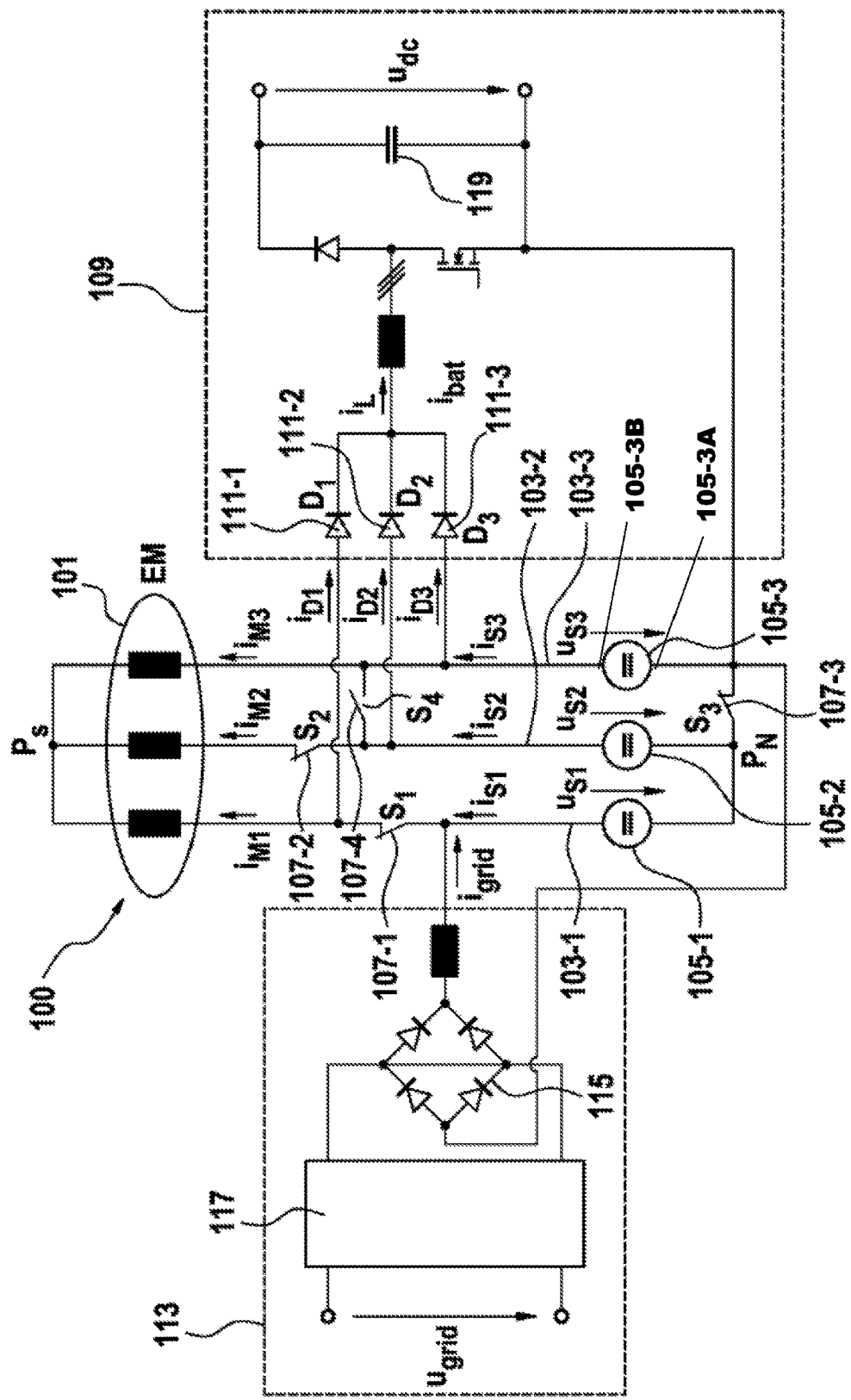
FIG. 1 shows a circuit arrangement for operating an electric machine during driving operation.

FIG. 1 shows a circuit arrangement 100 for operating an electric machine 101. The circuit arrangement 100 depicts a topology of an integrated drive system including multiple battery direct inverters 105-1, 105-2, and 105-3. The electric machine is used, for example, for driving a battery-powered electric or hybrid road vehicle. In addition to the drive phase lines 103-1, 103-2, and 103-3, the circuit arrangement 100 simultaneously provides a charging section 113 for supplying a charging current and a DC voltage section 109 for providing a DC voltage for a vehicle electrical system.

The battery direct inverters 105-1, 105-2, and 105-3 include a plurality of battery cells, which may be connected to transistors individually via an H full bridge. As a result, it is possible to generate AC voltages for the electric machine 101 by connecting or disconnecting individual battery cells.

The battery direct inverters 105-1, 105-2, and 105-3 are modular multilevel inverters. In this case, they are battery modules, for example, four units per phase, whose output voltage may be switched in a bipolar manner by means of a full bridge. As a result, a bypass is also made possible, i.e., a voltage of 0 V.

The circuit arrangement 100 includes a first, second, and third electrical drive phase line 103-1, 103-2, and 103-3. In the first electric drive phase line 103-1, the first battery direct inverter 105-1 is connected to the electric machine 101 via a first controllable switching device 107-1. In the second electric drive phase line 103-2, the second battery direct inverter 105-2 is connected to the electric machine 101 via a second switching device 107-2. In the third electric drive phase line 103-3, a third battery direct inverter 105-3 is connected to the electric machine 101.

A first inverter terminal 105-3A of the third battery direct inverter 105-3 is connectable to the second drive phase line 103-2 via a third switching device 107-3. A second inverter terminal 105-3B of the third battery direct inverter 105-3 is also connectable to the second drive phase line 103-2 via a fourth switching device 107-4. The fourth switching device 107-4 is connected in each case between the battery direct inverters 105-2 and 105-3 and the electric machine 101. A three-phase AC voltage is generated via the three drive phase lines including the battery direct inverters 105-1, 105-2, and 105-3. Each phase is supplied to the electric machine 101 via a corresponding drive phase line 103-1, 103-2, and 103-3. The switching devices 107-1, . . . , 107-4 are, for example, formed via contactors or semiconductor switches.

In addition, the circuit arrangement 100 includes a DC voltage section 109 for providing a DC voltage for a vehicle electrical system. The DC voltage section 109 is connected to the first, second, and third drive phase lines 103-1, 103-2, 103-3 via three diodes acting as rectifiers 111-1, 111-2, 111-3. A DC voltage for the vehicle electrical system of the vehicle is provided via the DC voltage section 109. The DC voltage section 109 includes a capacitor 119 for smoothing the DC voltage and components for decoupling a high-voltage intermediate circuit. The vehicle electrical system having a voltage of, for example, 12 V, is generated from the high-voltage vehicle electrical system. The DC voltage section 109 depicted as a multiphase step-up converter may be designed to be galvanically isolated and convert to a voltage of 48 V.

One operating strategy for a high-voltage decoupling is to set a positive voltage offset between the points $P_S$ and $P_N$. As a result, a high voltage may be provided even at a low (down to zero) phase voltage at the machine. In order to keep a voltage fluctuation low on the cathode side of the diodes 111-1, 111-2, 111-3, the battery direct inverters 105-1, 105-2, and 105-3 may be operated via flat-top modulation.

In addition, the circuit arrangement 100 includes a charging section 113 for supplying a charging current to the first, second, and third battery direct inverters 105-1, 105-2, 105-3. Electric energy is conducted from an external electrical network to the battery direct inverters 105-1, 105-2, 105-3 via the charging section 113. The charging section 113 is connected to the first drive phase line 103-1 and the third drive phase line 103-3, and includes components for single-phase AC current charging. The charging section 113 includes a bridge rectifier circuit 115 for rectifying an input voltage, and a grid filter or EMC filter for filtering an input voltage. The EMC filter may include a low-pass filter or a floating clock filter. They also have low-pass characteristics, but act on the difference between forward and reverse current. As a result, it is possible to suppress network feedback which acts in the direction of the network. DC voltage charging is possible via a tap in parallel with the components for AC current charging.

By means of the circuit arrangement 100, a complete battery direct inverter-based drive system is achieved. In connection with an operating strategy for the switching devices 107-1, 107-2, 107-3, and 107-4, the reception of electric power from the electrical network, an output of electric power to the electric machine, and the feeding of additional vehicle electrical system components by means of DC voltage is achieved during all operating states.

During driving operation, the switching devices 107-1, 107-2, 107-3 are closed and the switching device 107-4 is open. During charging operation, conversely, the switching devices 107-1, 107-2, 107-3 are open and the switching device 107-4 is closed. Charging is possible using both single-phase AC current directly at the electrical network, for example, at the 220 V level as well as at the 110 volt level, or a corresponding charging station using DC voltage and potentially higher power.

Figure 2:
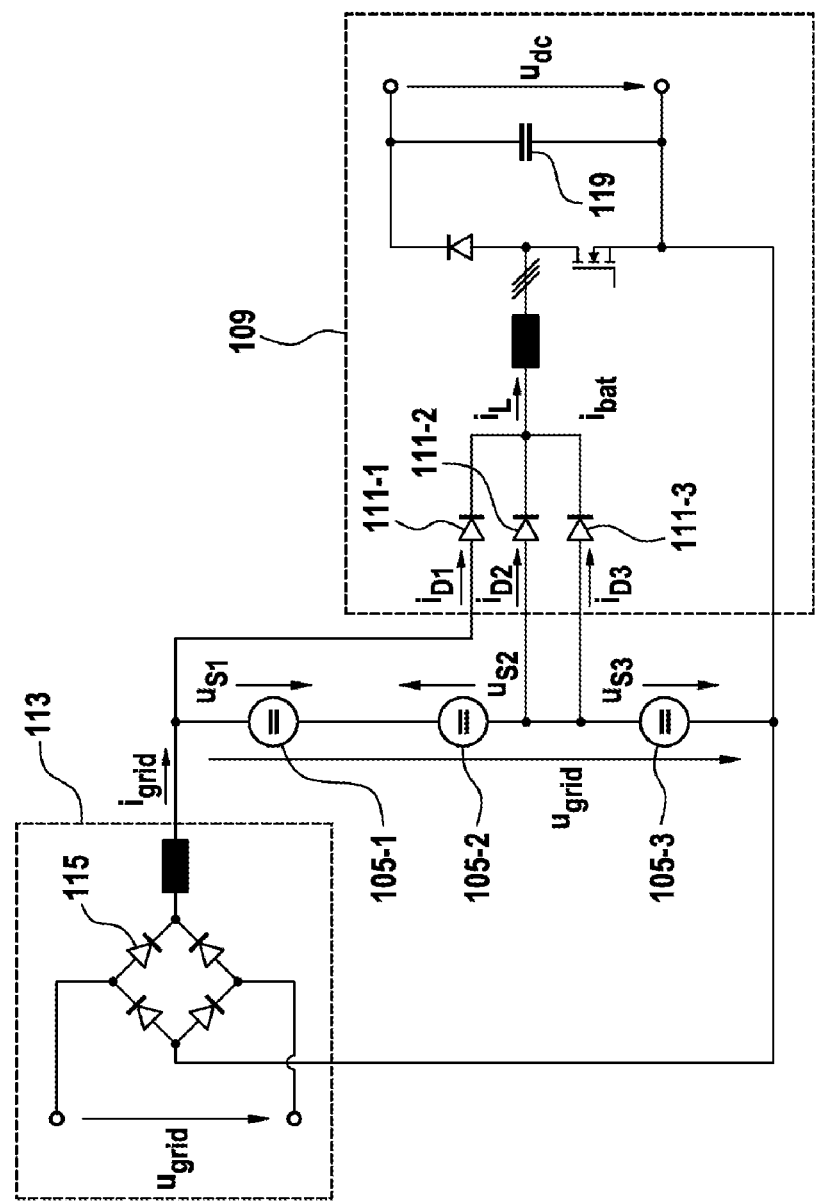
FIG. 2 shows a circuit arrangement for operating an electric machine during charging operation.

FIG. 2 shows the circuit arrangement 100 for operating an electric machine during charging operation. The circuit arrangement 100 is reduced to elements which are active during charging on a single-phase network.

The three drive phase lines 103-1, 103-2, and 103-3 including the battery direct inverters 105-1, 105-2, 105-3 are connected in series during charging operation. The battery direct inverters 105-1, 105-2, 105-3 are modulated in such a way that the voltages $U_{s1}-u_{S2}+u_{S3}$ correspond approximately to the grid voltage.

In order to be able to supply the high-voltage circuit independently from the pulsating charging power from a network side, the voltage drop $u_{s3}$ across the third battery direct inverter 105-3 may be set constantly greater than zero. The intermediate-circuit voltage control takes place via an intermediate-circuit voltage controller for controlling an output voltage.

Figure 3:
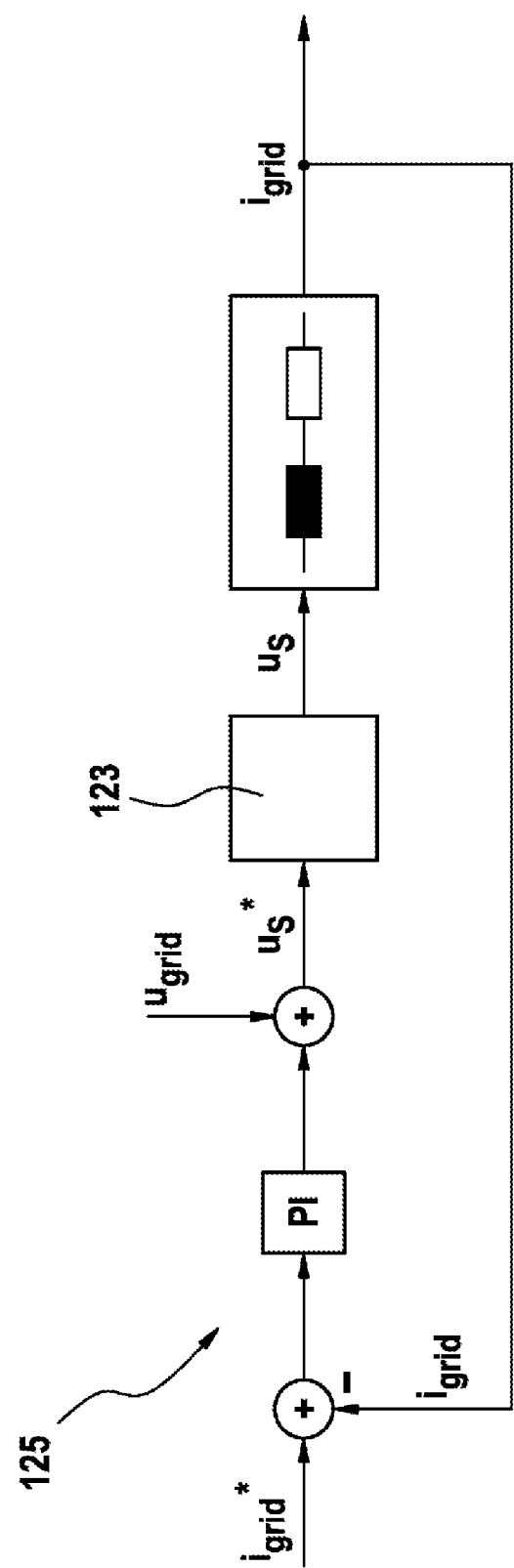
FIG. 3 shows a controller for controlling an input current.

FIG. 3 shows a controller 125 (grid controller) for controlling an input current flowing through the charging section 113. A control structure for the network current is achieved via the controller 123.

Figure 4:
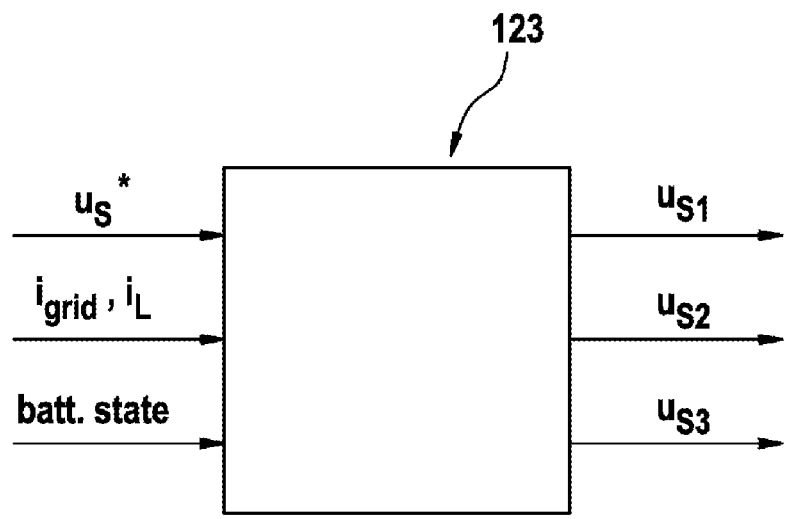
FIG. 4 shows a control unit in the form of a controller for distributing a voltage.

FIG. 4 shows a control unit 123 (module controller) acting as a controller for distributing a voltage across the individual battery direct inverters 105-1, 105-2, 105-3. A load distribution across the individual modules takes place via the controller.

Figure 5:
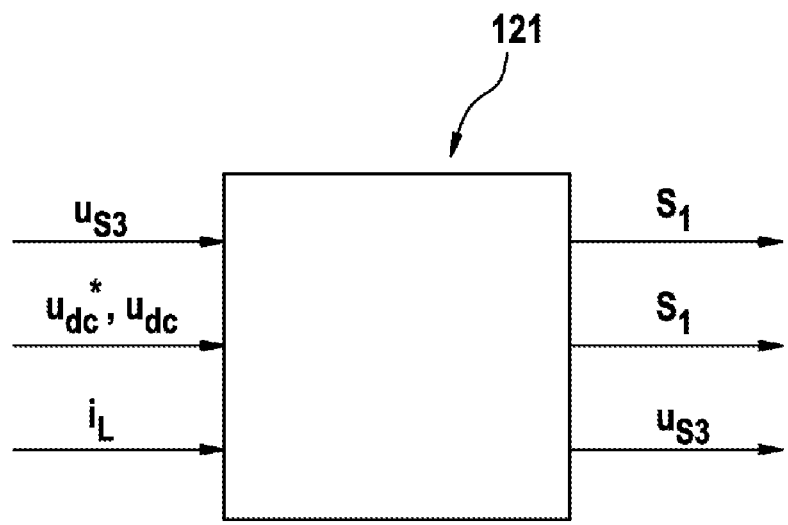
FIG. 5 shows an intermediate circuit voltage controller.

FIG. 5 shows an intermediate circuit voltage controller 121 (DC link controller) for controlling an output voltage.

Figure 6:
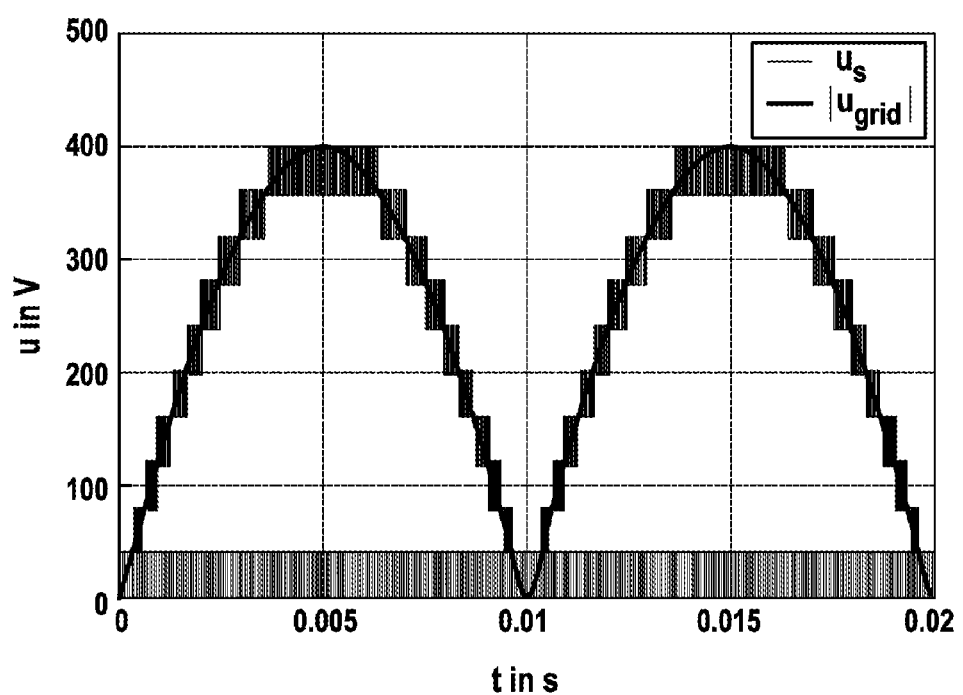
FIG. 6 shows a rectified grid voltage and output voltage of the battery direct inverter.

FIG. 6 shows a rectified grid voltage and output voltage of the battery direct inverter 105-1. Time t in seconds is plotted on the abscissa. The voltage in volts is plotted on the ordinate. The profile of the rectified grid voltage $u_{grid}$ and the output voltage $u_s$ of a battery direct inverter 105-1, 105-2, 105-3 is shown.

Figure 7:
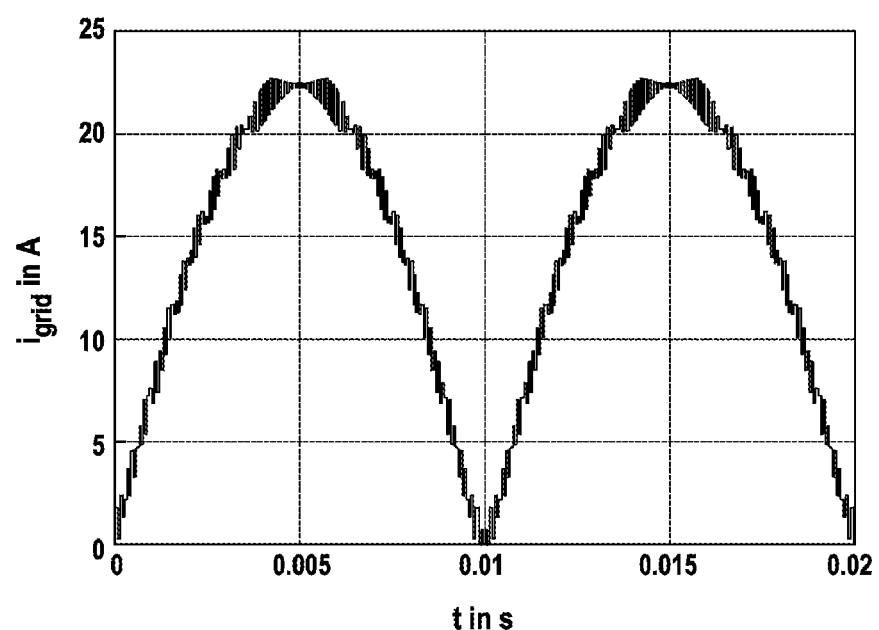
FIG. 7 shows a rectified input current in a grid choke.

FIG. 7 shows a rectified input current in a grid choke. Time t in seconds is plotted on the abscissa. The input current in amperes is plotted on the ordinate. The depicted input current having an effective value of 16 A (rms) results with the use of a 500 µH choke and a switching frequency of 10 kHz, without an additional input filter being taken into account. The distribution of the total output voltage across the individual submodules is effectuated by means of the control unit 123 acting as a module controller.

In general, in the circuit arrangement 100, input rectification in the charging section 113 may also be dispensed with. If it is used, the operating strategy for the high-voltage decoupling is simplified. The anode of the rectifier 111-1 may be connected between the switching device 107-1 and the battery direct inverter 105-1. The switching device 107-4 may be connected between the electric machine 101 and the switching device 107-2. The inductance of the electric machine 101 may be used for charging. In this case, the switching device 107-4 may be omitted. By means of the circuit arrangement 100, the functional requirements for a battery-powered electric drive system in a vehicle including a battery direct inverter are completely met.

All features described and depicted in connection with individual embodiments of the present invention may be provided in a different combination in the subject matter according to the present invention in order to achieve their advantageous effects.

The scope of protection of the present invention is provided by the claims and is not limited by the features described in the description or depicted in the figures.

The invention claimed is:

1. A circuit arrangement (100) for operating an electric machine (101) of a motor vehicle, the circuit arrangement comprising:
a first electric drive phase line (103-1) having a first battery direct inverter (105-1) connectable to the electric machine (101) via a first switching device (107-1);
a second electric drive phase line (103-2) having a second battery direct inverter (105-2) connectable to the electric machine (101) via a second switching device (107-2);
a third electric drive phase line (103-3) having a third battery direct inverter (105-3) connected to the electric machine (101), a first inverter terminal (105-3A) of the third battery direct inverter (105-3) is connected to the second drive phase line (103-2) via a third switching device (107-3), and a second inverter terminal (105-3B) of the third battery direct inverter (105-3) is connected to the second drive phase line (103-2) via a fourth switching device (107-4);
a DC voltage section (109) for providing a DC voltage for a vehicle electrical system, which is connected to the first, second, and third drive phase line (103-1, 103-2, 103-3) via a rectifier (111-1, 111-2, 111-3) in each case; and
a charging section (113) for supplying a charging current to the first, second, and third battery direct inverter (105-1, 105-2, 105-3), which is connected to the first drive phase line (103-1) and the third drive phase line (103-3), wherein a positive voltage offset is set between the two common connecting points (Ps, Pn) of the drive phase lines (103-1, 103-2, 103-3);
and/or a constantly positive voltage drop (Us3) is set across the third battery direct inverter (105-3).

2. The circuit arrangement (100) as claimed in claim 1, wherein the charging section (113) includes a bridge rectifier circuit (115) for rectifying an input voltage.

3. The circuit arrangement (100) as claimed in claim 1, wherein the charging section (113) includes a grid filter for filtering an input voltage.

4. The circuit arrangement (100) as claimed in claim 1, wherein the charging section (113) includes a controller (125) for controlling an input current.

5. The circuit arrangement (100) as claimed in claim 1, wherein the DC voltage section (109) includes an intermediate circuit voltage controller (121) for controlling an output voltage.

6. The circuit arrangement (100) as claimed in claim 1, wherein a terminal of the charging section (113) is connected between the first battery direct inverter (105-1) and the first switching device (107-1).

7. The circuit arrangement (100) as claimed in claim 1, wherein the switching devices (107-1, . . . , 107-4) are controlled based on a charging operation.

8. The circuit arrangement (100) as claimed in claim 1, wherein the circuit arrangement (100) includes a control unit (123) for distributing a voltage across the individual battery direct inverters (105-1, 105-2, 105-3).

9. The circuit arrangement (100) as claimed in claim 1, wherein the switching devices (107-1, . . . , 107-4) are formed by contactors.

10. A method for operating a circuit arrangement (100), which is used for operating an electric machine (101) of a motor vehicle, including a first electric drive phase line (103-1), in which a first battery direct inverter (105-1) is connectable to the electric machine (101) via a first switching device (107-1); a second electric drive phase line (103-2), in which a second battery direct inverter (105-2) is connectable to the electric machine (101) via a second switching device (107-2); a third electric drive phase line (103-3), in which a third battery direct inverter (105-3) is connected to the electric machine (101), a first inverter terminal (105-3A) of the third battery direct inverter (105-3) is connected to the second drive phase line (103-2) via a third switching device (107-3), and a second inverter terminal (105-3B) of the third battery direct inverter (105-3) is connected to the second drive phase line (103-2) via a fourth switching device (107-4); a DC voltage section (109) for providing a DC voltage for a vehicle electrical system, which is connected to the first, second, and third drive phase line (103-1, 103-2, 103-3) via a rectifier (111-1, 111-2, 111-3) in each case; and a charging section (113) for supplying a charging current to the first, second, and third battery direct inverter (105-1, 105-2, 105-3), which is connected to the first drive phase line (103-1) and the third drive phase line (103-3), including the steps of:

setting a positive voltage offset between the two common connecting points ($P_s$, $P_n$) of the drive phase lines (103-1, 103-2, 103-3); and/or setting a constantly positive voltage drop ($U_{s3}$) across the third battery direct inverter (105-3).

11. The circuit arrangement (100) as claimed in claim 1, wherein the charging section (113) includes an EMC filter (117) for filtering an input voltage.

12. The circuit arrangement (100) as claimed in claim 1, wherein the switching devices (107-1, . . . , 107-4) are controlled based on a driving operation.

13. The circuit arrangement (100) as claimed in claim 1, wherein the switching devices (107-1, . . . , 107-4) are formed by semiconductor components.

\* \* \* \* \*